United States Patent [19]

Fahrig

[11] 4,275,763
[45] Jun. 30, 1981

[54] DOUBLE-SLIDE VALVE
[75] Inventor: Robert J. Fahrig, Lansing, Ill.
[73] Assignee: Standard Oil Company (Indiana), Chicago, Ill.
[21] Appl. No.: 42,543
[22] Filed: May 25, 1979
[51] Int. Cl.³ .......................... F16K 3/00; F16K 47/08
[52] U.S. Cl. .................... 137/613; 137/375; 251/123
[58] Field of Search ............... 137/375, 613; 251/118, 251/123

[56] References Cited

U.S. PATENT DOCUMENTS

| | | | |
|---|---|---|---|
| 1,966,809 | 7/1934 | Wickersham et al. | 137/613 |
| 2,596,817 | 5/1952 | McGovney | 251/123 |
| 2,630,293 | 3/1953 | Smith | 251/123 |
| 2,749,940 | 6/1956 | Bronson | 137/613 |
| 3,337,178 | 8/1967 | Gordon | 137/613 |
| 3,701,359 | 11/1972 | Worley et al. | 137/375 |
| 3,937,247 | 2/1976 | Van der Wal | 137/375 |
| 4,079,747 | 3/1978 | Roberts | 137/375 |

FOREIGN PATENT DOCUMENTS

| | | | |
|---|---|---|---|
| 598397 | 5/1960 | Canada | 251/123 |
| 676981 | 3/1930 | France | 137/613 |

Primary Examiner—Martin P. Schwadron
Assistant Examiner—A. Michael Chambers
Attorney, Agent, or Firm—Lansing M. Hinrichs; William T. McClain; William H. Magidson

[57] ABSTRACT

Disclosed is a double-slide valve for controlling a stream of fluid entrained particulate material. The double-slide valve comprises a valve body forming a closed chamber having an inlet opening, an outlet opening, and a pair of valve stem openings. Within the chamber is mounted a flow port having an entrance and an exit opening through which the stream of particulate material passes. The flow of this stream is controlled by two slidable valve plates which slide traversably across the flow port openings upon guide means. The amount of valve plate movement is controlled by a control means.

8 Claims, 4 Drawing Figures

DOUBLE-SLIDE VALVE

BACKGROUND OF THE INVENTION

1. Field of the Invention

This invention relates to a double-slide valve for use in controlling the flow of particulate material, and more particularly, for use in controlling the flow of finely divided solid catalyst in fluid catalytic cracking units.

2. Description of the Prior Art

In the operation of a fluid catalytic cracking unit, large quantities of finely divided solid catalyst are circulated through the unit in a fluidized state. This finely divided solid catalyst must continuously pass between regenerator and reactor, and through supplementary equipment at very high flow rates, up to one hundred tons per minute, and in closely controlled quantities in order to establish and maintain the desired operating conditions, e.g., catalyst to oil ratio in the reactor, reactor temperature, catalyst residence time in the reactor, and the residence time and temperature in the regenerator. The flow of this finely divided fluidized solid catalyst is controlled by valves placed in the fluid catalyst transfer lines, i.e., the regenerator effluent standpipe for control of flow of regenerated catalyst to the reactor and the reactor effluent standpipe for control of flow of spent catalyst to the regenerator, and in supplementary equipment as for example a regenerator standpipe leading to recycle steam generators. These valves are normally installed in pairs wherever control is required. Usually, the upper valve of each pair is maintained as a safety reserve in case of failure of the lower operating valve.

Such conventional valves, presently in use in fluid catalytic cracking units, are slide valves which include a valve body, an inlet liner or port, a slide plate or disc, and actuating means to position the slide plate with respect to the liner or port to control the flow of the solid catalyst. The slide plate or disc is normally positioned in the slide valve on the downstream side of the flow port. Support or alignment guides are provided to hold the slide plate in this position and to allow the slide plate to be moved in a plane perpendicular to the flow of catalyst in order to control the rate of catalyst flow.

During the passage of large quantities of catalyst through these slide valves, erosion occurs because the restrictive opening increases the velocity of the catalyst. This increased velocity causes the leading edges of the slide plate and the edge of the flow port to wear extensively. This erosion becomes so severe that it requires a shutdown of the unit so that a replacement of the slide plate and port can be made.

Because of the erosion caused by the finely divided solid catalyst stream, valve design for flow control of finely divided solid catalyst presents a serious problem and a problem which is not encountered in normal flow control design or operation with liquids or gases. In normal catalytic cracking operations, the usual life of a slide valve can range from three months to three years. This range varies depending upon whether the slide valve is located on a regenerator standpipe where the temperatures can approach 1,400° F. or whether the valve is located on a reactor standpipe where the temperature is in the range of 800° F.–1,050° F. Also, lower velocities of the solid catalyst and the use of different types of liners, such as a hex-steel liner which contains a refractory material, may prolong the life of the valve. However, no present design or configuration has been able to withstand the erosion effect of the catalyst stream for a period substantially longer than three years.

The general object of this invention is to provide a double-slide valve for use in controlling the flow of particulate material. A more specific object of this invention is to provide a double-slide valve for use in controlling the flow of finely divided solid catalyst in fluid catalytic cracking units.

A further object of this invention is to provide a double-slide valve which will stand up to wear and erosion longer than existing slide valves thereby requiring fewer shutdowns of the units in which they are used.

Another object of this invention is to provide a cost savings on a catalytic cracking unit by replacing two valves with a single valve which requires fewer shutdowns of the unit and a less likely chance that equipment failure will occur.

Still another object of this invention is to reduce the number of valves needed in a standpipe thereby reducing the amount of pressure drop across the valves.

Other objects and advantages will become apparent to one skilled in the art based upon the ensuing description.

SUMMARY OF THE INVENTION

Briefly, this invention relates to a double-slide valve for controlling the flow of a fluidized stream of particulate material. This double-slide valve is particularly advantageous in controlling the flow of finely divided solid catalysts in fluid catalytic-cracking units. This double-slide valve comprises a valve body forming a closed chamber which has an inlet and an outlet opening for the passage of the flowing material and a pair of valve stem openings. A flow port is positioned within the closed chamber having a smaller diameter than that of the valve body for the purpose of restricting the flow of the particulate. This restrictive opening allows the unit to operate with a predetermined catalyst flow rate. Above the flow port is a traversably slidable valve plate or disc being greater in cross-sectional area than the cross-sectional area of the flow port. This valve plate slides along or upon a guide means, for example a support guide or an alignment guide, which maintains the lower surface of the upper valve plate substantially parallel to the entrance opening of the flow port. Below the flow port is a second traversably slidable valve plate which is greater in cross-sectional area than the cross-sectional area of the exit opening of the flow port. This lower valve plate slides on or in a separate guide means which retains the upper surface of the lower valve plate substantially parallel to the exit opening. Both the upper and lower valve plates or discs are connected to valve stems which pass out of the valve body through valve stem openings. The valve stems are attached to external control means, such as actuators, which are capable of moving the valve plates along or upon the guide means thereby adjusting the flow of the particulate which can pass through the flow port.

This double-slide valve is particularly useful in a catalytic system in which two previous slide valves were required. By using only one valve instead of two, one is able to operate a system with less hydraulic head in the standpipes. This means that the standpipes can be shortened, the regenerator and reactor vessels can be constructed closer to the ground and less equipment is needed in the unit. All three of these features add up to a considerable cost savings. The double-slide valve of this invention utilizes two valve plates which are angularly positioned about a single flow port. Preferably the two valve plates lie in different horizontal planes and are aligned 180° to each other so that the erosion effect on the flow port is minimized. This unique angling arrangement of the valve plates allows the double-slide valve to remain in operation for a significantly longer period of time before it becomes non-functional. The double-slide valve also has the additional feature of being able to regulate flow with one of the valve plates while retaining the second valve plate as a safety mechanism.

DETAILED DESCRIPTION OF THE INVENTION

Figure 1:
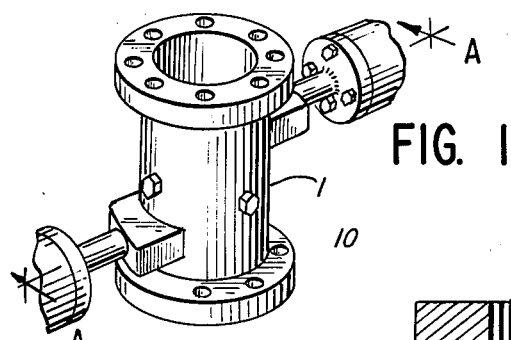
FIG. 1 is a perspective view of one embodiment of a double-slide valve of the present invention.

Referring now to the drawings, FIG. 1 shows one embodiment of a double-slide valve 10 of this invention. Valve body 1 is designed to be inserted between two sections of pipes or conduits which carry a stream of fluid entrained particulate material, such as a catalyst. The following discussion will be directed to a catalyst system although it should be known that such valves can be used to control the flow of particulate in any type of system.

Figure 2:
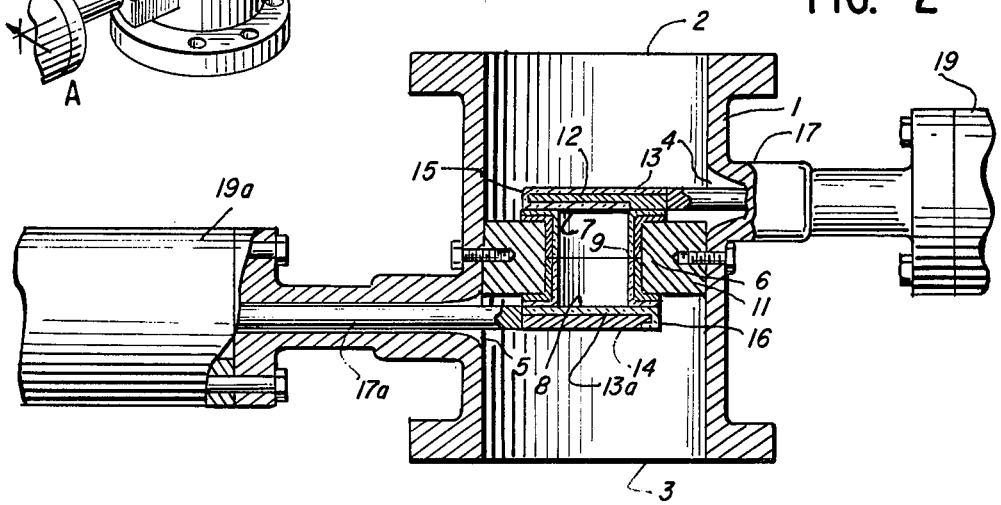
FIG. 2 is a cross-sectional view of the double-slide valve.
Figure 3:
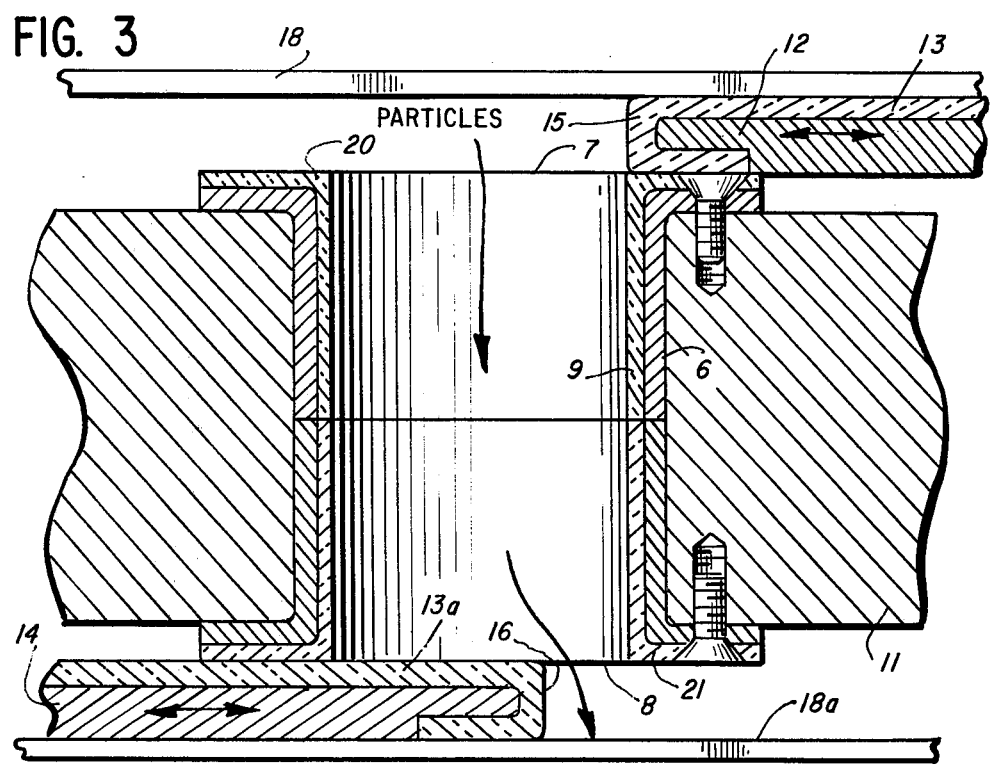
FIG. 3 is an enlarged sectional view of a double-slide valve showing the flow port in conjunction with the upper and lower slidable valve plates.
Figure 4:
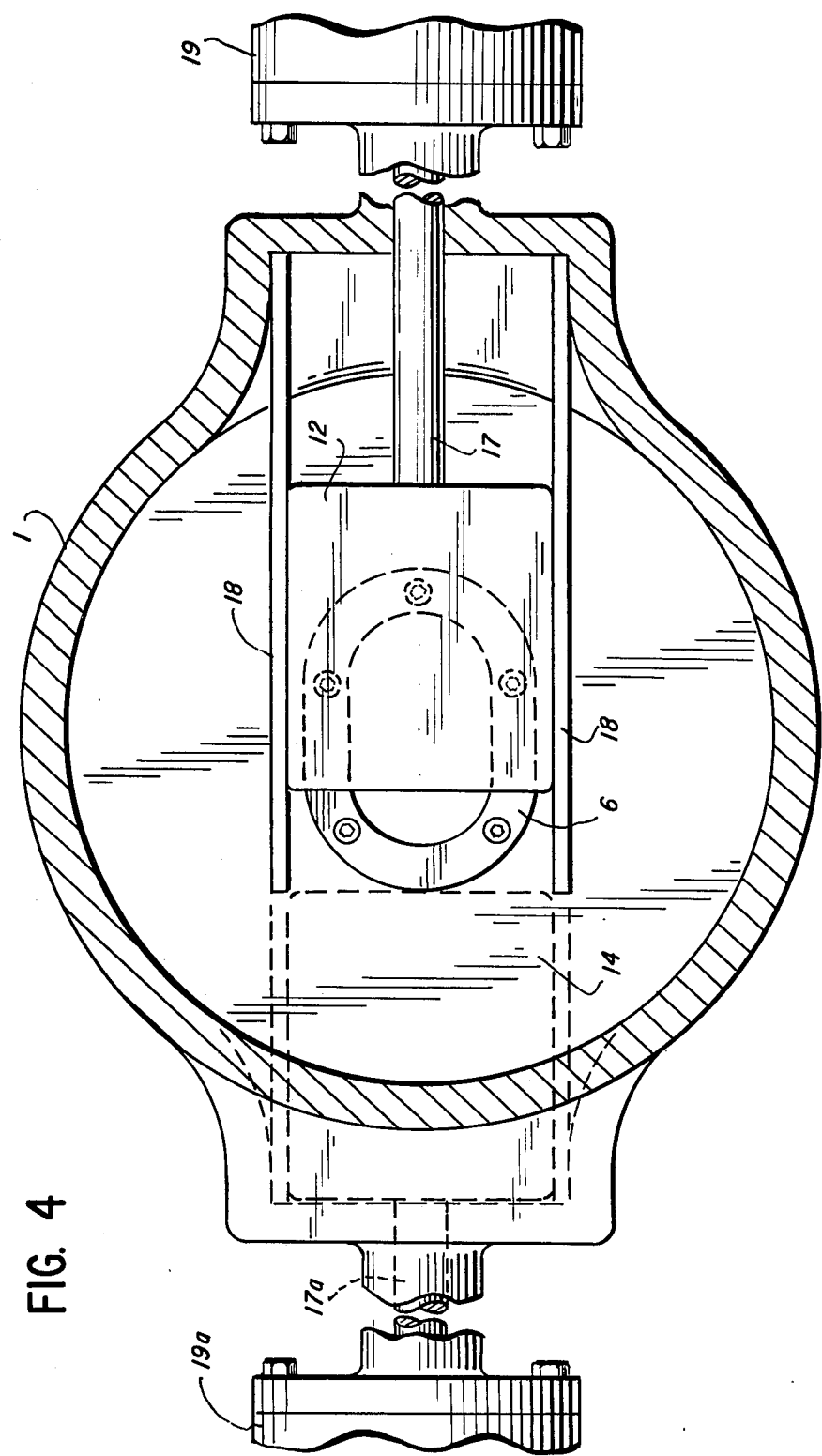
FIG. 4 is a top view of one embodiment of the double-slide valve showing one of the possible positions of the slidable valve plates.

In a fluid catalytic cracking unit, these double-slide valves can be positioned in both the reactor and regenerator standpipes. These standpipes transfer large quantities of catalyst from one vessel to the next. Double-slide valve 10 controls the flow rate of this finely divided solid catalyst by restricting the passage of the material through a flow port 6. (See FIGS. 2 and 3). Valve body 1 forms a closed chamber having an inlet opening 2, an outlet opening 3 and a pair of valve stem openings 4 and 5, respectively. The configuration of valve body 1 is not critical but the cylindrical or tulip shape design is most commonly encountered. For inlet and outlet openings 2 and 3, it is preferred that they be axially aligned so as to facilitate the flow of the particulate material to and from flow port 6. However, any angular configuration such as an elbow bend or a T joint will work satisfactorily. Valve stem openings 4 and 5 are located in valve body 1 between inlet opening 2 and outlet opening 3 and provide an opening through which a valve stem can pass. Valve stem opening 4 can be positioned 0°–360° in relation to opening 5 but preferably openings 4 and 5 are 180° apart and at different elevations. This allows valve plates 12 and 14 which are connected to valve stems 17 and 17(a) to slide adjacent to entrance opening 7 and exit opening 8 of flow port 6. The opposite or angular arrangement of valve plates 12 and 14 allows the wear caused by the flowing particulate to be distributed about a greater portion of the circumferential surface of flow port 6. It is also possible to position valve stem openings 4 and 5 in the same plane, thereby having two slide plates which can reciprocate about an opening in flow port 6. Multiple valve stem openings can be employed if one desires to use multiple slide plates. Another arrangement is to position valve plates 12 and 14 in the same plane about one of the openings in flow port 6 and interconnect them so that both can be reciprocated about the opening. This would allow two different edges of the same opening in flow port 6 to wear thereby increasing the life of double-slide valve 10.

Positioned within valve body 1 is flow port 6 which is a hollow sleeve-like structure having a smaller diameter than inlet opening 2. Flow port 6 can be circular, elliptical or of an odd shape in cross-sectional configuration. The purpose of flow port 6 is to form a restrictive passageway through which the flowing material must pass. Flow port 6 has an entrance opening 7 and an exit opening 8, see FIG. 3 which can be varied in area by slidable valve plates 12 and 14. In order to resist wear and prolong the effect of erosion from the passing material, flow port 6 is constructed of a hardened metal alloy and/or is heat treated. An alternative procedure is to attach a protective liner 9 onto the exposed surface of flow port 6. This protective liner 9 can be any type of material which is resistant to either heat or wear, such as a refractory material. Common types of hardened and/or refractory liners can be constructed from stainless steel, nickel, cobalt, and ceramic. Other hardened metal alloys or refractory nonmetallic minerals can be utilized including combinations of two or more materials, such as a hex-steel refractory composition.

Flow port 6 is mounted in valve body 1 by conventional fastening means so that the hollow passageway is in alignment with the flow of the passing particulate. The actual cross-sectional configuration or diameter of the passageway can vary as long as the flowing material is not overly restricted. Flow port 6 can be constructed of one or more members and is attached to support member 11 which in turn is securely fastened to valve body 1. Positioned above and below flow port 6 is an upper valve plate 12 and a lower valve plate 14 both of which are greater in cross-sectional area than the cross-sectional area of entrance opening 7 and exit opening 8. Both upper and lower valve plates 12 and 14 are slidably mounted on guide means, such as guide rails 18 and 18(a). The guide rails 18 and 18(a) allow for the transverse movement of valve plates 12 and 14 across entrance opening 7 and exit opening 8. Guide means 18 and 18(a) can be support guides or alignment guides of various configurations, such as L-rails, channel-shaped rails, etc. It should be emphasized that it is possible to position both valve plates 12 and 14 on one guide means 18 either above or below flow port 6. In this arrangement, the valve plates would slide back and forth over only one opening. To extend the life of the double-slide valve even longer, another two valve plates could be mounted about the other opening. Such alternative arrangements are possible without departing from the scope of the present invention.

Both valve plates 12 and 14 can contain a protective lining or covering 13 and 13(a) which is a heat resistant and/or wear resistant material. An example of a heat and wear resistant material is a refractory ceramic liner. An example of a wear resistant material at a temperature below 1,000° F. is a hardened metal alloy. A preferred liner is "hex-steel" in which a refractory material is securely held in a mesh formed of crimped bars of metal alloy. Such coverings 13 and 13(a) are especially useful when double-slide valve 10 is employed in a catalytic unit where temperatures normally range from 800°–1,500° F. These high temperatures along with particulate velocities of about 40 feet/second cause the valves to erode very easily. Protective coverings 13 and 13(a) should cover the complete upper surface of valve plates 12 and 14 and preferably extend around and about outer edges 15 and 16 respectively on valve plates 12 and 14.

Slidable valve plates 12 and 14 are securely connected to valve stems 17 and 17(a) which are movably positioned in valve stem openings 4 and 5. The opposite ends of valve stems 17 and 17(a) are connected to control means 19 and 19(a). Control means 19 and 19(a) are external actuating devices which when actuated are capable of traversably sliding valve plates 12 and 14 along guide means 18 and 18(a). Control means 19 and 19(a) can be manually, hydraulically, electrically or pneumatically operated, preferably hydraulically.

In operation of double-slide valve 10, one valve plate is slidably positioned over or below the passageway opening in flow port 6 so as to restrict the passage of the flowing material. Preferably, valve plate 12 is drawn back so as to completely clear entrance opening 7 while valve plate 14 is adjusted to accommodate a desired flow of material. After a period of time the leading edge 16 of valve plate 14 and the corner edge 21 of flow port 6 will gradually erode away. In order to maintain a desired flow, valve plate 14 can be periodically moved inward across exit opening 8, thereby decreasing the size of the opening. This procedure can be practiced until edges 16 and 21 become so eroded that they cannot satisfy the restriction control requirements of the unit. At this point, valve plate 14 is retracted back away from exit opening 8 as valve plate 12 is slidably positioned above entrance opening 7. The outer edge 20 of valve plate 12 and the upper corner edge 20 of flow port 6 are now the surfaces which will be exposed to wear and erosion. As wear is evidenced, adjustment can again be made by actuating control 19 to compensate for the change. This double-slide valve arrangement permits the useful life of flow port 6 to be extended. Such a double-slide valve will operate approximately twice as long as a conventional slide valve thereby extending the time between shutdowns while reducing the operating cost of the unit. In addition, the unique feature of positioning two slidable valve plates about a single flow port is advantageous from a technical viewpoint. First, it allows one to utilize more of the circumferential area of the flow port. This means that the double-slide valve can be used for a longer length of time without jeopardizing the safety or operation of the unit. Second, the use of only one slide valve in a standpipe, instead of two valves, creates a lower pressure drop across the system. This is beneficial in that it means that a lesser hydraulic head is required, which in turn permits the regenerator and reactor vessels to be positioned at lower elevations. A reduction in elevation corresponds to a large cost savings during construction. Thirdly, the use of only one double-slide valve means a smaller capital outlay and a less likely chance that something will go wrong or malfunction.

It should be appreciated that the present invention is not to be construed as being limited by the illustrative embodiments. It is possible to produce still other embodiments without departing from the inventive concepts herein disclosed. Such embodiments are within the ability of those skilled in the art.

I claim:

1. A double-slide valve for use in a system for controlling the flow rate of a fluidized stream of particulate material, which comprises:
   (a) a valve body forming a closed chamber having an inlet opening, an outlet opening and a pair of oppositely arranged valve stem openings positioned between said inlet and outlet openings;
   (b) a flow port mounted within said valve body, the ends of said port constituting axially aligned entrance and exit openings through which said particulate material must pass and said flow port being in alignment with said inlet and outlet openings of said valve body;
   (c) two traversably slidable valve plates, each connected to a valve stem which passes through said valve stem openings, each of said valve plates being greater in cross-sectional area than the cross-sectional area of said flow port;
   (d) guide means mounted adjacent to said flow port upon which said valve plates are slidably guided;
   (e) control means attached to each of said valve stems for traversably sliding said valve plates across the entrance and exit openings of said flow port; and
   (f) each of said traversably slidable valve plates adaptable to valve one of said entrance and exits openings of said flow port, respectively, in response to said respective control means.

2. A double-slide valve for controlling the rate of flow of a fluidized stream of particulate material which comprises:
   (a) a valve body forming a closed chamber having an inlet opening, an outlet opening and a pair of valve stem openings positioned between said inlet and outlet openings;
   (b) a flow port mounted within said valve body, the ends of said port being entrance and exit openings through which said particulate material must pass and said port being axially aligned with said inlet and outlet openings of said valve body;
   (c) an upper traversably slidable valve plate connected to a first valve stem which passes through one of said valve stem openings, said valve plate being greater in cross-sectional area than the cross-sectional area of said entrance opening of said flow port;
   (d) an upper guide means for slidably guiding said upper valve plate adjacent to and over said entrance opening;
   (e) a lower traversably slidable valve plate connected to a second valve stem which passes through said second valve stem opening, said valve plate being greater in cross-sectional area than the cross-sectional area of said exit opening of said flow port;
   (f) a lower guide means for slidably guiding said lower valve plate adjacent to and under said exit opening;
   (g) control means attached to each of said valve stems for traversably sliding said upper and lower valve plates along said upper and lower guide means; and
   (h) said upper and lower traversably slidable valve plates adaptable to valve said entrance and exit openings of said flow port, respectively, in response to said respective control means.

3. The double-slide valve of claim 2 wherein said pair of valve stem openings are angularly positioned on said valve body.

4. The double-slide valve of claim 2 wherein said pair of valve stem openings are oppositely situated.

5. The double-slide valve of claim 2 wherein said flow port has a protective liner.

6. The double-slide valve of claim 5 wherein said protective liner is a hardened surface.

7. The double-slide valve of claim 2 wherein the cross-section of said flow port is circular in shape.

8. The double-slide valve of claim 2 wherein the cross-section of said flow port is elliptical in shape.

* * * * *